(12) United States Patent
Parmar et al.

(10) Patent No.: US 10,028,189 B2
(45) Date of Patent: *Jul. 17, 2018

(54) MOBILE TELECOMMUNICATIONS SYSTEM

(71) Applicant: NEC CORPORATION, Minato-ku, Tokyo (JP)

(72) Inventors: Gina Parmar, Surrey (GB); Robert Patterson, Surrey (GB)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,176

(22) Filed: Jan. 25, 2017

(65) Prior Publication Data

US 2017/0135011 A1 May 11, 2017

Related U.S. Application Data

(63) Continuation of application No. 14/972,888, filed on Dec. 17, 2015, now Pat. No. 9,591,538, which is a (Continued)

(30) Foreign Application Priority Data

May 28, 1999 (GB) .................................. 9912604.7

(51) Int. Cl.
*H04W 36/00* (2009.01)
*H04W 36/14* (2009.01)
(Continued)

(52) U.S. Cl.
CPC ........ *H04W 36/14* (2013.01); *H04W 36/0011* (2013.01); *H04W 76/02* (2013.01); *H04W 76/10* (2018.02); *H04W 88/06* (2013.01)

(58) Field of Classification Search
CPC ..... H04W 36/30; H04W 36/12; H04W 88/06; H04W 80/04; H04W 36/14; H04W 36/0011; H04W 76/02
(Continued)

(56) References Cited

U.S. PATENT DOCUMENTS

| 5,594,718 A | 1/1997 | Weaver, Jr. et al. |
| 5,594,731 A | 1/1997 | Reissner |

(Continued)

FOREIGN PATENT DOCUMENTS

| EP | 0 615 391 A1 | 9/1994 |
| EP | 0 676 907 A2 | 10/1995 |

(Continued)

OTHER PUBLICATIONS

3$^{rd}$ Generation Partnership Project 3GPP); Technical Specification Group (TSG) RAN; Working Group 2 (WG2); RRC Protocol Specification TS 25.331 V1.0.0, pp. 21-22, Apr. 1999.

(Continued)

*Primary Examiner* — Danh Le
(74) *Attorney, Agent, or Firm* — Foley & Lardner LLP

(57) ABSTRACT

A method of processing a handover request from a base station controller (BSC) of a GSM (Global System for Mobile communication)-type network. The method comprises the steps of passing a handover request with GSM-type parameters from a base station controller (BSC) through a Master Switching Center (MSC) of the GSM-type network to a UMTS core network (CN) and to a Radio Network Controller (RNC) of the UMTS (Universal Mobile Telecommunications System) network, translating the GSM-type parameters to UTRAN parameters in the Radio Network Controller (RNC), and allocating UTRAN resources in response to the translated parameters.

2 Claims, 1 Drawing Sheet

Related U.S. Application Data continuation of application No. 14/303,887, filed on Jun. 13, 2014, now Pat. No. 9,247,582, which is a continuation of application No. 13/342,670, filed on Jan. 3, 2012, now Pat. No. 8,792,893, which is a continuation of application No. 10/790,674, filed on Mar. 3, 2004, now Pat. No. 8,107,962, which is a continuation of application No. 09/578,705, filed on May 26, 2000, now Pat. No. 6,725,039.

(51) Int. Cl.
*H04W 76/02* (2009.01)
*H04W 76/10* (2018.01)
*H04W 88/06* (2009.01)

(58) Field of Classification Search
USPC .................. 455/436, 552.1, 438; 370/331
See application file for complete search history.

(56) References Cited

U.S. PATENT DOCUMENTS

| | | | |
|---|---|---|---|
| 5,815,816 A | 9/1998 | Isumi | |
| 5,857,153 A | 1/1999 | Lupien | |
| 5,920,721 A | 7/1999 | Hunter et al. | |
| 5,930,714 A | 7/1999 | Abu-Amara et al. | |
| 5,956,637 A | 9/1999 | Ericsson et al. | |
| 5,966,662 A | 10/1999 | Murto | |
| 6,014,565 A | 1/2000 | Bonta | |
| 6,067,460 A | 5/2000 | Alanara et al. | |
| 6,075,989 A * | 6/2000 | Moore | H04W 36/0094 455/436 |
| 6,181,686 B1 | 1/2001 | Hamalainen et al. | |
| 6,192,244 B1 | 2/2001 | Abbadessa | |
| 6,216,004 B1 | 4/2001 | Tiedemann et al. | |
| 6,243,582 B1 | 6/2001 | Lahtinen | |
| 6,259,915 B1 | 7/2001 | Raith | |
| 6,311,054 B1 | 10/2001 | Korpela | |
| 6,351,638 B1 * | 2/2002 | Robinson | H04B 7/18563 455/418 |
| 6,363,253 B1 * | 3/2002 | Valentine | H04W 76/02 455/414.1 |
| 6,374,112 B1 * | 4/2002 | Widegren | H04W 28/18 370/352 |
| 6,377,804 B1 * | 4/2002 | Lintulampi | H04W 60/00 455/426.1 |
| 6,424,638 B1 | 7/2002 | Ray et al. | |
| 6,445,917 B1 | 9/2002 | Bark et al. | |
| 6,452,911 B1 | 9/2002 | Seo | |
| 6,466,556 B1 * | 10/2002 | Boudreaux | H04W 36/12 370/331 |
| 6,510,146 B1 * | 1/2003 | Korpela | H04W 36/0061 370/332 |
| 6,549,779 B1 * | 4/2003 | Muller | H04W 36/0066 370/331 |
| 6,556,820 B1 | 4/2003 | Le et al. | |
| 6,574,473 B2 | 6/2003 | Rinne et al. | |
| 6,584,116 B1 | 6/2003 | Gourgue et al. | |
| 6,665,312 B1 | 12/2003 | Rasanen | |
| 6,788,952 B1 | 9/2004 | Jokimies et al. | |
| 6,792,283 B1 | 9/2004 | Roberts | |
| 7,200,110 B1 | 4/2007 | Burns et al. | |
| 7,200,401 B1 * | 4/2007 | Hulkkonen | H04W 36/24 370/331 |
| 7,778,641 B1 * | 8/2010 | Willars | H04W 36/0066 370/331 |
| 2001/0046863 A1 | 11/2001 | Rinne et al. | |
| 2002/0037726 A1 | 3/2002 | Czaja et al. | |

FOREIGN PATENT DOCUMENTS

| | | |
|---|---|---|
| EP | 0 898 438 A2 | 2/1998 |
| JP | 11-75237 | 3/1999 |
| WO | WO 97/31503 | 8/1997 |
| WO | WO 97/41698 | 11/1997 |
| WO | WO 98/06226 | 2/1998 |
| WO | WO 98/59513 | 12/1998 |
| WO | WO 99/20071 | 4/1999 |
| WO | WO 99/59364 | 11/1999 |

OTHER PUBLICATIONS

3$^{rd}$ Generation Partnership Project 3GPP); Technical Specification Group (TSG) RAN; Working Group 2 (WG2); RRC Protocol Specification TS 25.331 V1.0.0, pp. 1-72, Apr. 1999.

* cited by examiner

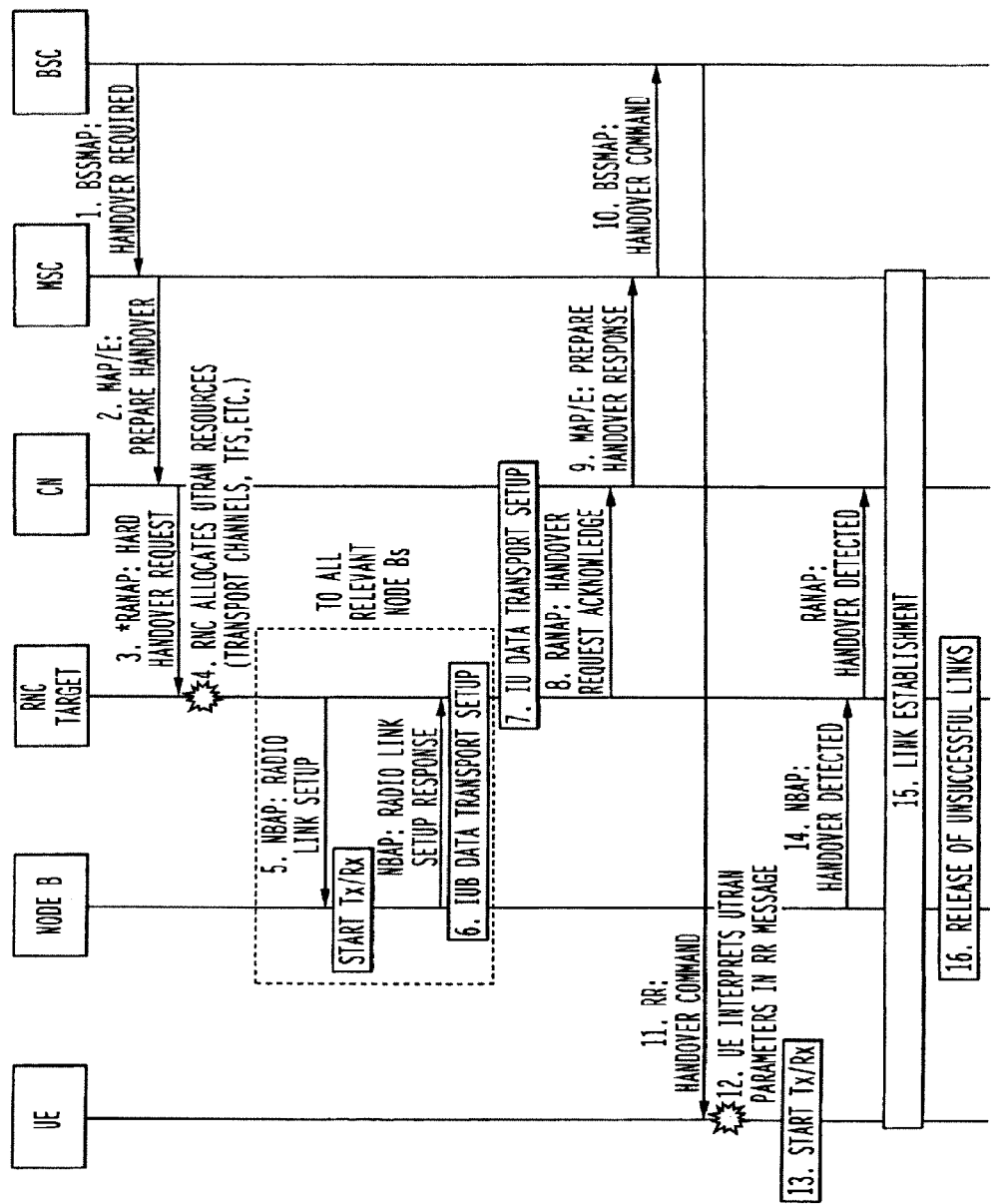

MOBILE TELECOMMUNICATIONS SYSTEM

CROSS-REFERENCE TO RELATED PATENT APPLICATIONS

This application is a continuation of U.S. application Ser. No. 14/972,888 filed Dec. 17, 2015, now pending; which is a continuation of U.S. application Ser. No. 14/303,887, filed Jun. 13, 2014, now U.S. Pat. No. 9,247,582, issued Jan. 26, 2016; which is a continuation of U.S. application Ser. No. 13/342,670 filed Jan. 3, 2012, now U.S. Pat. No. 8,792,893, issued Jul. 29, 2014; which is a continuation of U.S. application Ser. No. 10/790,674, filed Mar. 3, 2004, now U.S. Pat. No. 8,107,962, issued Jan. 31, 2012; which is a continuation of U.S. application Ser. No. 09/578,705, filed May 26, 2000, now U.S. Pat. No. 6,725,039, issued Apr. 20, 2004; which claims priority to British Patent Application No. 9912604.7, filed May 28, 1999, by Gina Parmar and Robert Patterson. This application claims only subject matter disclosed in the parent application and therefore presents no new matter. The disclosures of all prior applications are herein incorporated by reference in their entirety.

BACKGROUND OF THE INVENTION

The present invention relates to a mobile telecommunication system and is particularly concerned with the handover of calls between two types of communication systems, particularly handover between a GSM and a UMTS network.

It has been generally proposed that it would be desirable to provide handover between a GSM and a UMTS network. However, this is not a straightforward task to accomplish and there are a number of problems to implement before this can be successfully achieved; the present invention is concerned with these problems. It is, however, more generally applicable to interoperability between networks using different protocols; in such a case, the terms used herein are to be construed as applying to the relevant equivalent components of the networks to which the invention is applied. Although aspects of the invention provide independent solutions to various aspects of the problems concerned with GSM and UMTS handover, all are concerned with this common problem and in particular are concerned with a novel solution in which an RNC of the UMTS network controls handover to a large extent. In a first aspect, the invention provides a method of processing a handover request from a base station controller (BSC) of a GSM network, the method comprising passing a handover request with GSM parameters from a base station controller (BSC) through a Master Switching Centre (MSC) of the GSM network to a UMTS core network (C) and to a Radio Network Controller (RNC) of the UMTS network; in the radio network controller, translating the GSM parameters to UTRAN parameters; and allocating UTRAN resources in response to the translated parameters. Thus, rather than translating the GSM parameters on entry to the UMTS network, the GSM parameters pass transparently through at least a portion of the UMTS network to the RNC. The parameters may include one or more of data rate, call type (voice, data, fax, other, e.g. video, IP), Quality of Service etc. This reduces processing load elsewhere in the network and enables the RNC to allocate the optimum UTRAN resources for the call.

Preferably, the RNC is arranged to switch directly from a GSM connection to a soft handover UMTS mode. This is advantageous compared to simply establishing an individual connection from the User Equipment (UE) to a single UMTS access node. This preferred features may be provided independently in a second aspect in which the invention provides a method of switching from a GSM network to a UMTS network characterised by switching directly from a mode in which User Equipment (UE) is in communication with a GSM base station to a UMTS diversity mode in which the User Equipment is in communication with a plurality of UMTS access nodes, preferably comprising configuring the UTRAN so that a plurality of access nodes are prepared to communicate with the UE and/or preferably supplying a list of potential access nodes to the UE.

Preferably, the Radio Network Controller (RNC) is arranged, following translation of the GSM format handover request firstly to perform radio link setup and then, following a response from the radio link, to perform data transport setup for communication between the Radio Network Controller and the Core Network, This allows communication with the Core Network to be established following successful radio setup rather than independently, thus avoiding unnecessary use of CN or RNC (Iu interface) resources if radio link setup is not possible. This preferable feature may be provided independently in a third aspect in which the invention provides a method of establishing UMTS communication with User Equipment following receipt by a Radio Network Controller of a GSM handover request, the method comprising, in the Radio Network Controller, setting up a radio link to a Node B and, following acknowledgement of the radio link setup, in the Radio Network Controller, setting up data transport between the Radio Network Controller and the Core Network.

Preferably, the Radio Network Controller is arranged (preferably following radio link setup) to pass a handover message containing UTRAN parameters through the GSM network (for example as a message), preferably through the Core Network to the GSM Master Switching Centre and preferably at least through the Base Station Controller of the GSM network, to the User Equipment; the method further comprising interpreting the UTRAN parameters in the User Equipment and, in response to the parameters, initiating communication between the User Equipment and the UMTS network.

This may be provided independently in a fourth aspect in which the invention provides a method of establishing UMTS communication between User Equipment and a UMTS network, wherein the User Equipment is in communication with a GSM network, the method comprising forwarding UTRAN parameter information, preferably comprising a list of potential UMTS Access Nodes via the GSM network, preferably from a Radio Network Controller of the UMTS network, to the User Equipment and, in the User Equipment, interpreting the UTRAN parameter information and initiating communication with the UMTS network.

Thus, in contrast to the initial step, where GSM information tunnels into the UMTS network and is interpreted in the RNC, the UTRAN information tunnels through the GSM network without interpretation and is interpreted by the UE. This means that the GSM network need not include intelligence to process the information, simplifying interconnection with existing GSM networks.

Following initiation of communication, preferably the UE is arranged to establish a link through the RNC of the UMTS network to the MSC of the GSM network (where the GSM call originated). This then completes establishing a link from the MSC to the UE via the UMTS network.

Preferably, potential links supplied in a list to the UE on which satisfactory communication is not possible are deleted from the list of available links; this step may be provided independently in a method of performing soft handover from a GSM network to a UMTS network comprising supplying a list of potential UMTS access nodes to User Equipment; establishing communication between the UE and at least one UMTS access node; and deleting potential nodes with which satisfactory communication is not possible from said list.

Preferably, at least during handover, the User Equipment (UE) is arranged to communicate over both the GSM network and the UMTS network simultaneously or quasi-simultaneously. This feature may be provided independently in a fifth aspect in which the invention provides a method of communicating between User Equipment and GSM and UMTS networks comprising communicating information simultaneously or quasi-simultaneously via both network during handover from one network to the other.

All of the above aspects may be provided independently, but are advantageously combined in a system. Thus, the invention may provide a method of handing over a GSM call to a UMTS network comprising passing a handover request from the GSM network (preferably from a BSC, preferably containing GSM call parameters) to a RNC of the UMTS network; interpreting the request in the RNC and initiating call setup (preferably performing radio link setup and preferably thereafter, in response to a successful setup, performing data link to core network setup); forwarding handover information containing UTRAN parameters (preferably including a list of potential access nodes) to UE (preferably passing the UTRAN information transparently through the GSM network, for example as a message, to be interpreted by the UE); in the UE, setting up a UMTS call based on the UTRAN parameters.

The invention extends to a radio network, or combination of networks, radio network components, particularly RNCs and UEs all adapted to implement any of the above method aspects and in particular are concerned with a particular novel solution in which an RNC of the UMTS network controls handover to a large extent.

The invention is described in the context of GSM and UMTS networks for ease of understanding but is applicable to handover between other networks with similar characteristics. Accordingly, all references to GSM and MTS and all terms of art used herein are to be construed as encompassing equivalent features of other networks. In particular, the present Japanese PDC network is of similar architecture to GSM and the term GSM (or GSM-type) as used in the specification and claims is intended to encompass such a network. Similarly, the term UMTS (and related terms) is intended to encompass a UMTS system in accordance with present standards and proposals and any derivatives or equivalents thereof.

BRIEF DESCRIPTION OF THE DRAWINGS

An embodiment of the invention will now be described, with reference to the accompanying drawing in which FIG. 1 depicts the sequence of events between GSM to UMTS handover via a MAP/E interface. This will also be applicable via the IWU.

DETAILED DESCRIPTION OF THE PREFERRED EMBODIMENTS

1. The BSC sends Handover Required message to the GSM MSC. This includes the GSM information elements (service information rate, service type, etc.) and the UMTS cell/Node-B information on which good radio quality is achievable.

2. The GSM MSC sends MAP/E message Prepare Handover to the UMTS CN forwarding the UMTS cell-ids transparently.

3. The CN sends RANAP message Handover Request to the Target RNC. This message will contain information elements indicating from which network type this handover is taking place e.g. "handover-type"="from GSM". It will also contain information elements allowing transparent transfer of GSM Parameters to the RNC, e.g. GSM Bearer Capability, version number and other relevant parameters relating to the GSM call. Additionally, the relevant UMTS cell/Node-B information provided by the MS-UE is also transferred transparently to the RNC.

4. The RNC maps GSM appropriate call parameters to the relevant UMTS logical channel, transport channel and allocates radio resource parameters as appropriate (e.g. DL channelization code, UL spreading factor, UL scrambling code, Radio Frequency, Radio Link ID, Link Reference, S-RNTI, Transport Format Sets, Transport Format Combination Set, Initial DL Power). This function can only be done at this state, since only the RNC knows the status of the radio resources.

5. Since dedicated transport channels are selected, the GSM call can go into immediate soft-handover.
i) The RNC sends NBAP message Radio Link Setup to all relevant Node Bs.
ii) All relevant Node Bs start transmission/reception.
iii) All relevant Node Bs send NBAP message Radio Link Setup Response to the RNC.

6. The RNC sets up Iub transport bearer to all relevant Node Bs. The RNC is in a condition to set up the Transport Bearer across Iub since it knows if the UTRAN resources have been setup successfully.

7. The RNC sets up Iu transport bearer. The RNC is in a condition to set up the Transport Bearer across Iu since it knows if the UTRAN resources have been set up successfully.

8. The RNC sends Handover Request Acknowledge passing the appropriate UMTS parameters to the CN (e.g. DL channelization code, UL Spreading Factor, UL Scrambling Code, etc.) which are destined for the UE allowing the successful handover of the UE to UMTS.

9. The CN sends Prepare Handover Response to the GSM MSC (forwarding the UMTS parameters).

10. The GSM MSC sends Handover Command to the BSC (forwarding the UMTS parameters).

11. BSC sends the RR message Handover Command to the UE. This contains the necessary UMTS parameters.

12. The UE interprets the UMTS parameters within the RR message and is able to switch the call from a GSM call into a UMTS call with multiple or single diversity branches as indicated in the UMTS parameters. At this sate, the mobile unit is receiving information from the GSM network using its GSM capabilities and uses this information to switch communication to the UMTS network or simultaneously communicate with the UMTS network and GSM network using its UMTS and GSM capabilities.

13. The UE starts Tx/Rx.

14. On detection of synchronization, the Node B sends NBAP message Handover Detect to the RNC.

15. If at least one of the Radio Links has been successfully set up, then the RNC is able to establish the RLC link for the DTCH and the RRC for the DCCH to the UE. The RNC is then able to signal to the CN and onwards to the MSC that the handover is complete. The MSN is able to switch the call through on the new UTRAN leg.

16. In the case of having allocated multiple radio links on the DL and if UL synchronization has not been detected, then the appropriate signalling may take place between Node B and RNC to release the unused radio resources.

It will be appreciated that the invention can be applied to other network configurations. To assist in appreciating how the invention may be extended, a glossary of terms used in the art pertaining to UMTS systems is provided; any of the terms of art may be replaced by functionally equivalent components in a non-UMTS system. The following documents are incorporated herein by reference;

[1] Draft ETR/SMG-50102. "Special Mobile Group (SMG) Vocabulary for the Universal Mobile Telecommunications system".

[2] ETSI DTR/SMG-0225xxU, "Universal Mobile Telecommunications System (UMTS); Vocabulary for the UTRAN", UMTS 25.XX Version 0.1.0.

Terms and Definitions

Active Set

Set of radio links simultaneously involved in a specific communication service between a UE and a UTRAN.

Cell

A cell is a geographical area that can be identified by a UE from a (cell) identification that is broadcast from one UTRAN Access Point.

Coded Composite Transport Channel (CCTrCH)

A data stream resulting from encoding and multiplexing of one or several transport channels.

The data stream of the CCTrCH is fed to a data splitter unit that splits the CCTrCH's data stream onto one or several Physical Channel Data Streams.

Contention Resolution

A functionality or procedure to solve the collision of identities on the initial random access messages from two (or more) UEs.

Forward Handover

A type of handover initiated by the UE. The UE sends the request for establishment of a new radio link in the new cell, i.e., it does not use the current radio link for performing handover but a radio link of the new cell.

Gateway $UE_R$/Seed

A ODMA relay node that also communicates with the UTRAN using either TDD or FDD mode.

Handover

Handover is a family of procedures that adds or removes one or several radio links between one UE and UTRAN when a RRC connection exists and the position of the UE is known on cell level in the UTRAN.

Hard Handover

Hard handover is a category of handover procedures where all the old radio links in the UE are abandoned before the new radio links are established.

Logical Channel

A logical channel is an information stream dedicated to the transfer of a specific type of information over the radio interface.

ODMA Relay Node

A relay device, such as a $UE_R$ or Seed, that is capable of relaying using the ODMA protocol.

Physical Channel

In FDD mode, a physical channel is defined by code, frequency and, in the uplink, relative phase (I/O. In TDD, mode, a physical channel is defined by code, frequency, and time-slot.

Physical Channel Data Stream

In the uplink, a data stream that is transmitted on one physical channel.

In the down link, a data stream that is transmitted on one physical channel in each cell of the active set.

Radio Access Bearer

The service that the access stratum provides to the non-access stratum for transfer of user data between UE and CN.

Radio Frame

Radio frame is a numbered time interval of 10 ms duration used for data transmission on the radio physical channel. A radio frame is divided into 16 time slots of 0.625 ms duration. The unit of data that is mapped to a radio frame (10 ms time interval) may also be referred to as radio frame.

Radio Link

The set of (radio) physical channels comprised in a transmission path between a UE to one UTRAN access point.

Radio Link Addition

The procedure where a new radio ink is added to the active set.

Radio Link Removal

The procedure where a radio link is removed from the active set.

Radio Network Temporary Identifier (RNTI)

A Radio Network Temporary Identifier is an identifier for a US when an RRC connection exists. It is e.g. used by the MAC protocol on common Transport Channels (RACH, FACH, PCH).

Relay

A device capable of receiving and transmitting information for another user.

Relaying

The process of receiving and transmitting information for another user, such as carried out by a $UE_R$.

Relaylink

Relaylink is the communications line between two ODMA relay nodes.

Root Relay

ODMA relay node where communications are either sourced or sunk.

RRC Connection

A point-to-point bi-directional connection between RRC peer entities on the UE and the UTRAN sides, respectively. An UE has either zero or one RRC Connection.

Seed

A ODMA relay node which is deployed by a network operator and is generally fixed, constantly powered, and has no display/keypad.

Signaling Connection

An acknowledged-mode link between the user equpment and the core network to transfer higher layer information between peer entities in the non-access stratum.

Signaling Link

Provides an acknowledged-mode link layer to transfer the UE-UTRAN signalling messages as well as UE-Core Network singalling messages (using the signalling connection).

Soft Handover

Soft handover is a category of handover procedures where the radio links are added and abandoned in such manner that the UE always keeps at least one radio link to the UTRAN.

Transmission Time Interval

Transmission Time Interval is defined as the inter-arrival time of Transport Block Sets, i.e., the time it should take to transmit a Transport Block Set. It is always a multiple of 10 ms (the length of one Radio Frame).

Transport Block

Transport Block is defined as the basic unit passed down to L1 from MAC, for L1 processing. An equivalent term for Transport Block is "MAC PDU".

Transport Block Set

Transport Block Set is defined as a set of Transport Blocks which is passed to L1 from MAC at the same time instance using the same transport channel. An equivalent term for Transport Block Set is "MAC PDU Set".

Transport Block Set Size

Transport Block Set Size is defined as the number of bits in a Transport Block Set.

Transport Block Size

Transport Block Size is defined as the size (number of bits) of a Transport Block.

Transport Channel

The channels offered by the physical layer to Layer 2 for data transport between peer L1 entities are denoted as Transport Channels.

Different types of transport channels are defined by how and with which characteristics data is transferred on the physical layer, e.g., whether using dedicated or common physical channels are employed.

Transport Format

A Transport Format is defined as a format offered by L1 to MAC for the delivery of a Transport Block Set during a Transmission Time Interval on a Transport Channel. The Transport Format constitutes of two parts—one dynamic part and one semi-static part.

Transport Format Combination

A Transport Format Combination is defined as the combination of currently valid Transport Formats on all Transport Channels of a UE, i.e., containing one Transport Format from each Transport Channel.

Transport Format Combination Set

A Transport Format Combination Set is defined as a set of Transport Format Combinations to be used by a UE.

Transport Format Combination Indicator (TFCI)

A Transport Format Combination Indicator is a representation of the current Transport Format Combination.

Transport Format Indicator (TFI)

A label for a specific Transport Format within a Transport Format Set.

Transport Format Set

A Transport Format Set is defined as the set of Transport Formats associated to a Transport Channel.

URA Updating

URA updating is a family of procedures that updates the UTRAN registration area of a UE when a RRC connection exists and the position of the UE is known on URA level in the UTRAN.

User Equipment/Relay Enabled ($UE_R$)

A UE with ODMA relay operation enabled.

UTRAN Registration Area (URA)

The UTRAN Registration Area is an area covered by a number of cells. The URA is only internally known in the UTRAN.

UTRAN Access Point

A conceptual point within the UTRAN performing radio transmission and reception. A UTRAN access point is associated with one specific cell, i.e., there exists one UTRAN access point for each cell. It is the UTRAN-side end point of a radio link.

ABBREVIATIONS

ARQ Automatic Repeat Request
BCCH Broadcast Control Channel
BCH Broadcast Channel
BPSK Binary Phase Shift Keying
BSS Base Station System
BTS base Transceiver Station
C- Control-
CC Call Control
CCCH Common Control Channel
CCH Control Channel
CCTrCH Coded Composite Transport Channel
CDMA Code Division Multiple Access
CN Core Network
CRC Cyclic Redundancy Check
DC Dedicated Control (SAP)
DCA Dynamic Channel Allocation
DCCH Dedicated Control Channel
DCH Dedicated Channel
DHO Diversity Handover
DL Downlink
DRNC Drift Radio Network Controller
DS-CDMA Direct-Sequence Code Division Multiple Access
DSCH Downlink Shared Channel
DTCH Dedicated Traffic Channel
DTX Discontinuous Transmission
FACH Forward Link Access Channel
FAUSCH Fast Uplink Signalling Channel
FCS Frame Check Sequence
FDD Frequency Division Duplex
GC General Control (SAP)
HO Handover
HHO Hard Handover
ITU International Telecommunication Union
kbps kilo-bits per second
ksps kilo-symbols per second
L1 Layer 1 (physical layer)
L2 Layer 2 (data ink layer)
L3 Layer 3 (network layer)
LAC Link Access Control
MAC Medium Access Control
MM Mobility Management
Mcps Mega-ships per second
Mt Notification (SAP)
OCCCH ODMA Common Control Channel
ODCCH ODMA Dedicated Control Channel
ODCH ODMA Dedicated Channel
ODMA Opportunity Driven Multiple Access
ORACH ODMA Random Access Channel
ODTCH ODMA Dedicated Traffic Channel
PCCH Paging Conrol Channel
PCH Paging Channel
PDU Protocol Data Unit
PHY Physical Layer
PhyCHPhysical Channel
RACH Random Access Channel
RLC Radio Link Control
RNC Radio Network Controller
RNS Radio Network Subsystem
RNTI Radio Network Temporary Identity
RRC Radio Resource Control
SAP Service Access Point
SCCH Synchronization Control Channel
SCH Synchronization Channel
SDU Service Data Unit
SIR Signal-to-Interference Ratio
SRNC Serving Radio Network Controller
SRNS Serving Radio Network Subsystem
TCH Traffic Channel
TDD Time Division Duplex
TFCI Transport Format Combination Indicator
TFI Transport Format Indicator
TN Termination node
TPC Transmit Power Control
TRX Transmitter/Receiver
U- User-
UE User Equipment
$UE_R$ User Equipment with ODMA relay operation enabled
UL Uplink
UMTS Universal Mobile Telecommunciations System
URA UTRAN Registration Area
UTRA UMTS Terrestrial Radio Access
UTRAN UMTS Terrestrial Radio Access Network

What is claimed is:

1. A method for a User Equipment (UE), the method comprising:
   communicating with a Global System for Mobile communication (GSM)-type network;
   receiving a Universal Mobile Telecommunication system (UMTS) Terrestrial Radio Access Network (UTRAN) parameter via the GSM-type network, wherein the UTRAN parameter comprises a list of radio links; and
   establishing a RRC (Radio Resource Control) connection after receiving the UTRAN parameter;
   wherein the list is used to transfer communication between the UE and the GSM-type network to a UMTS network.

2. A method for a network node for a Universal Mobile Telecommunication system (UMTS), the method comprising:
   communicating with a Global System for Mobile communication (GSM)-type network;
   communicating with a User Equipment (UE);
   receiving a UMTS Terrestrial Radio Access Network (UTRAN) parameter from the GSM-type network, wherein the UTRAN parameter comprises a list of radio links; and
   transmitting the UTRAN parameter to the UE;
   establishing a RRC (Radio Resource Control) connection with the UE after transmitting the UTRAN parameter;
   wherein the list is used to transfer communication between the UE and the GSM-type network to a UMTS network.

* * * * *